(12) United States Patent
Bouchez et al.

(10) Patent No.: US 8,629,636 B2
(45) Date of Patent: Jan. 14, 2014

(54) ALTERNATING-CURRENT ELECTRIC MOTOR OF A COMBINED ELECTRIC DEVICE FOR POWERING AND CHARGING

(75) Inventors: Boris Bouchez, Cergy le Haut (FR); Luis de Sousa, Eragny sur Seine (FR)

(73) Assignee: Valeo Systemes de Controle Moteur, Cergy Saint Christophe (FR)

( * ) Notice: Subject to any disclaimer, the term of this patent is extended or adjusted under 35 U.S.C. 154(b) by 265 days.

(21) Appl. No.: 13/168,061

(22) Filed: Jun. 24, 2011

(65) Prior Publication Data

US 2011/0316454 A1     Dec. 29, 2011

(30) Foreign Application Priority Data

Jun. 25, 2010   (FR) ...................... 10 55084

(51) Int. Cl.
*H02P 1/00*     (2006.01)
(52) U.S. Cl.
USPC ................. 318/139; 318/400.41; 318/727
(58) Field of Classification Search
USPC ................ 318/139, 400.41, 727, 748, 754; 310/200; 327/365; 361/97
See application file for complete search history.

(56) References Cited

U.S. PATENT DOCUMENTS 5,264,736 A * 11/1993 Jacobson ...................... 327/365

FOREIGN PATENT DOCUMENTS

| EP | 0 603 778 A1 | 6/1994 |
| FR | 2 844 646 A1 | 3/2004 |
| WO | 97/08009 A1 | 3/1997 |
| WO | 2010/057893 A1 | 5/2010 |

OTHER PUBLICATIONS

French Search Report issued in the corresponding French application No. 1055084, mailing date Apr. 15, 2011 (3 pages).

* cited by examiner

*Primary Examiner* — Karen Masih
(74) *Attorney, Agent, or Firm* — Osha Liang LLP

(57) ABSTRACT

The present invention relates to an alternating-current electric motor of a combined electric device for powering and charging, the said electric motor being formed by a stator connected to an electricity network of which the number of phases is lower than the number of phases of the said motor, the said charging current of the said network being injected via a connection point dividing each phase of the said stator connected to a phase of the said network into two half-windings, the said motor being characterized in that each half-winding of a phase comprises a plurality of coils wired together so as to reduce the magnetic linkage of each half-winding at the said connection point so that there exists an apparent non-zero inductance at the said connection point in charging mode of the said device.

13 Claims, 6 Drawing Sheets

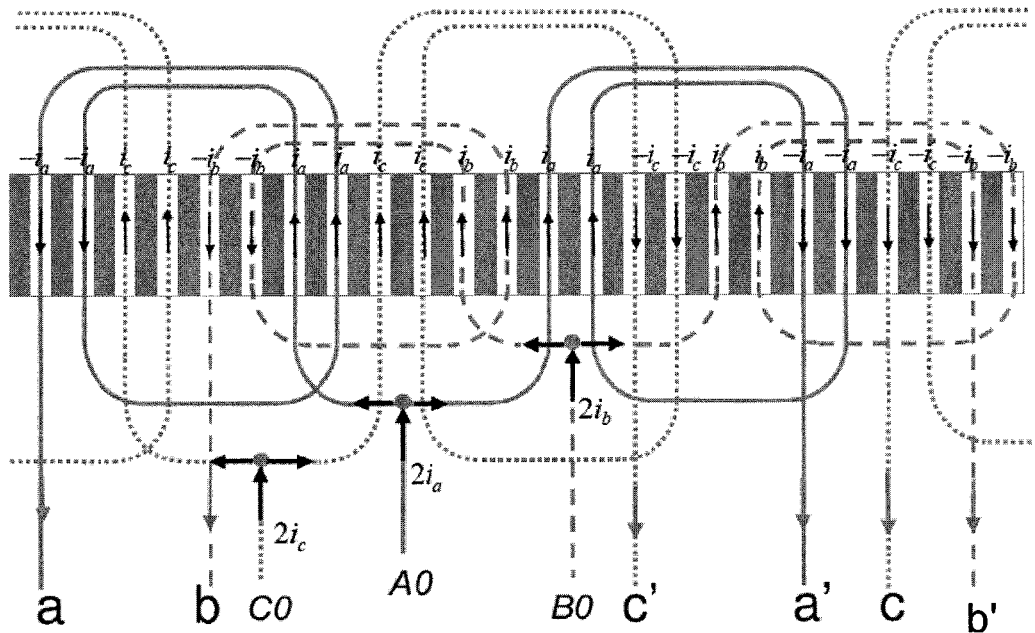
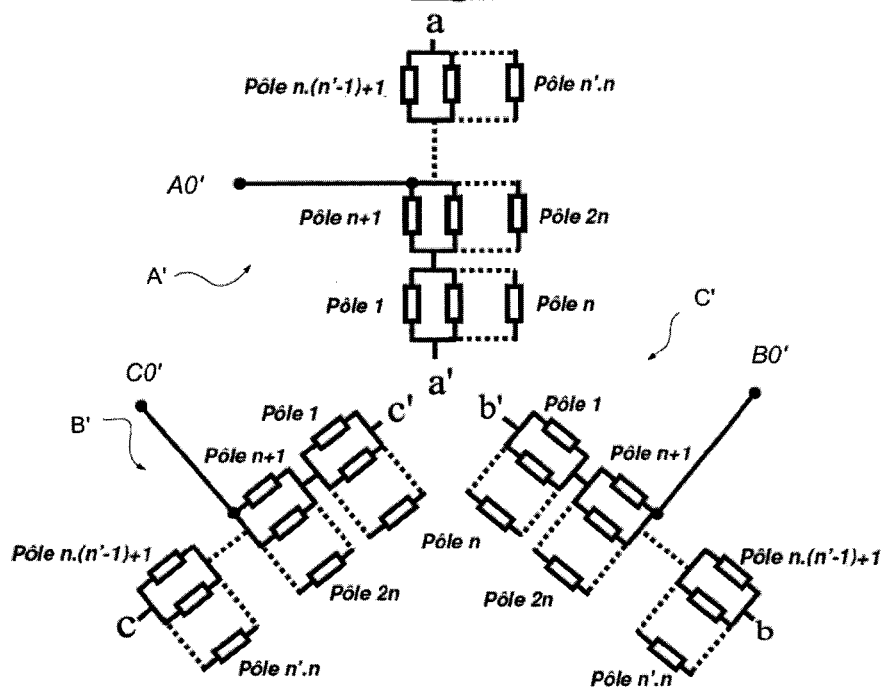
Fig. 3
Fig. 4

ALTERNATING-CURRENT ELECTRIC MOTOR OF A COMBINED ELECTRIC DEVICE FOR POWERING AND CHARGING

The present invention relates to an alternating-current electric motor of a combined electric device for powering and charging making it possible to power an electric motor or an alternator by rechargeable batteries.

The invention will advantageously find an application in the field of electric or hybrid motor vehicles in which the batteries can power the motor via an inverter and be recharged when the motor vehicle is stopped by means of an alternating-current electricity network.

However, although particularly intended for such an application, the electric device according to the invention may be used in other fields and notably in energy-generating devices of the wind or hydraulic type.

BACKGROUND OF THE INVENTION

Conventionally, an electric or hybrid vehicle comprises a traction system formed by high-voltage rechargeable batteries delivering a direct current to an inverter which transforms this direct current into an alternating current making it possible to power an electric motor, of the rotating electric machine type, the latter setting the vehicle in motion.

In order to recharge these high-voltage batteries, it is known practice to fit the vehicle with an on-board charging device essentially comprising an alternating-current—direct-current converter making it possible to rectify the alternating current power of the domestic electricity network into direct-current power for charging the batteries.

Usually, the charging device may also comprise a power factor corrector the role of which is to limit the harmonic rejection on the electricity network.

The electronic components of the power system on the one hand and of the charging system on the other hand are costly. Moreover, the powering of the motor and the charging of the batteries take place at different phases, so it has been proposed, in applications EP 0 603 778 and WO97/08009, to reuse a portion of the motor and of the components used for powering it in order to produce the device for charging the batteries.

Accordingly, the device for charging the batteries uses the inverter in order to form an alternating current—direct current converter and the coils of the motor to form the inductances. The transition from the motor powering mode to the battery charging mode is ensured by switching means with power contactors by disconnecting the neutral.

The use of the power connectors is however problematic because, ensuring the passage of the currents from the electric machine, they must be overdimensioned. In order to alleviate this drawback, one solution consists in producing a structure having switching means incorporated with H bridges.

However, in the abovementioned two cases, the use of the phases of the motor as an inductance in order to rectify the current of the electricity network causes disruptions in the rotor of the motor. Specifically, the inductances are magnetized by the alternating currents of the electricity network thus creating magnetic fields. These magnetic fields act on the rotor which may start moving, for example by vibrating, and even, depending on the magnetic fields and on the characteristics of the rotor, start to rotate. This setting in motion poses problems of both comfort and safety in the case of a use of the combined electric device in an electric vehicle even though the latter may be fitted with a system for decoupling the train of the machine during charging.

To alleviate this drawback, one solution consists in producing a static compensation consisting in injecting the charging current into at least one winding of the stator connected to a phase of the network by using an additional connection point, called a mid-point.

A winding of the stator conventionally comprises a plurality of coils formed by a plurality of turns.

The mid-point separates the phase winding of the stator into two portions so that the charging current, injected via the mid-point, is divided into two currents flowing in opposite directions through each half-winding, each half-winding comprising the same number of turns.

This solution of compensation by injecting charging current into the mid-points of the phase windings results in the magnetomotive force being cancelled out and the inductances of the two half-windings being cancelled out. All that remains apparent is the very weak leakage inductance associated with the imperfections of the coils.

Too weak an inductance of the motor makes it difficult to control the charging currents, notably because of considerably current inversions at the quench frequency.

SUBJECT OF THE INVENTION

In this context, the present invention aims to provide an alternating-current electric motor for a device making it possible to power the electric motor, and to recharge batteries by using elements of the power system, that is to say elements of the motor and of the inverter, and such that the electric motor comprises a stator winding making it possible to obtain an apparent inductance at the mid-point that is sufficiently powerful to alleviate the aforementioned drawbacks while not setting the rotor in motion in charging mode.

SUMMARY OF THE INVENTION

For this purpose, the invention proposes an alternating-current electric motor of an electric device for powering and charging, the said electric motor being formed by a stator connected to an electricity network of which the number of phases is lower than the number of phases of the said motor, the said charging current of the said network being injected via a connection point dividing each phase of the said stator connected to a phase of the said network into two half-windings, the said motor being characterized in that each half-winding of a phase of the stator comprises a plurality of coils wired so as to reduce the magnetic linkage of each half-winding at the said connection point so that there exists an apparent non-zero inductance at the said connection point in charging mode of the said device.

For example, the coils of a phase are distributed on either side of the connection point of the phase so as to reduce the magnetic linkage of the half-windings at the connection point.

In a particular example, the coils that are linked, and even strongly linked, together are placed on one and the same side relative to the connection point. In other words, the coils that are linked, and even strongly linked, together belong to the same half-winding. Moreover, the coils that are unlinked, or even weakly linked, together are placed in different sides relative to the connection point. In other words, the coils that are unlinked, or even weakly linked, together belong to different half-windings.

For example, each coil is distributed over several slots. Two coils of a phase belonging to different half-windings are distributed over slots that are respectively positioned on either side of the connection point.

For example, each half-winding comprises at least two coils wound in reverse direction one relative to the other so as to reduce the magnetic linkage between the two half-windings of a phase. In a particular example, each half-winding comprises an even number of coils, each coil having a corresponding coil wound in reverse direction.

Thus, the mode of winding according to the invention makes it possible to obtain a high value of the apparent inductance in charging mode at the connection point while not setting the rotor in motion in charging mode.

The decoupling of the half-windings of each phase of the stator therefore makes it possible to improve the charging of the batteries of the device and the control of the charging current.

Specifically, the apparent inductance during charge is increased and made greater than a leakage inductance of the coils. In particular, the apparent inductance corresponds to an effective inductance of the motor. For example, the apparent inductance at the connection point in charging mode is between 1 mH and 100 mH.

In addition to the main features that have just been mentioned in the above section, the alternating-current electric motor according to the invention may have one or more additional features below, considered individually or in all the technically possible combinations:
- each half-winding is formed by a plurality n of coils wired in series;
- each half-winding is formed by a plurality n'/2 of groups of coils wired in series, each of the said groups comprising a plurality n of coils wired in parallel;
- each half-winding comprises the same number of turns;
- each of the half-windings of a phase is diametrically opposed on the said stator so as to reduce the magnetic linkage between two half-windings of a phase;
- the said stator comprises air gaps at its periphery making it possible to reduce the magnetic linkage between the two half-windings of a phase;
- the said motor comprises a rotor comprising openings and/or air gaps making it possible to increase the reluctance between the two half-windings of each phase of the said stator.

A further subject of the invention is a combined electric device for powering and charging comprising an alternating-current electric motor according to the invention connected to an electricity network, an inverter and means for accumulating electric energy.

Advantageously, the electric device also comprises a direct-current-direct-current converter.

BRIEF DESCRIPTION OF THE DRAWINGS

The present invention will be better understood on reading a detailed exemplary embodiment with reference to the appended drawings, supplied as a non-limiting example, amongst which:

FIG. 3 represents schematically an exemplary embodiment of the winding mode illustrated in FIG. 2 on a three-phase stator with two pairs of poles with winding distributed over two slots;

FIG. 4 represents schematically a second mode of winding a three-phase motor stator of an electric motor according to the invention;

DETAILED DESCRIPTION OF THE INVENTION

Figure 1:
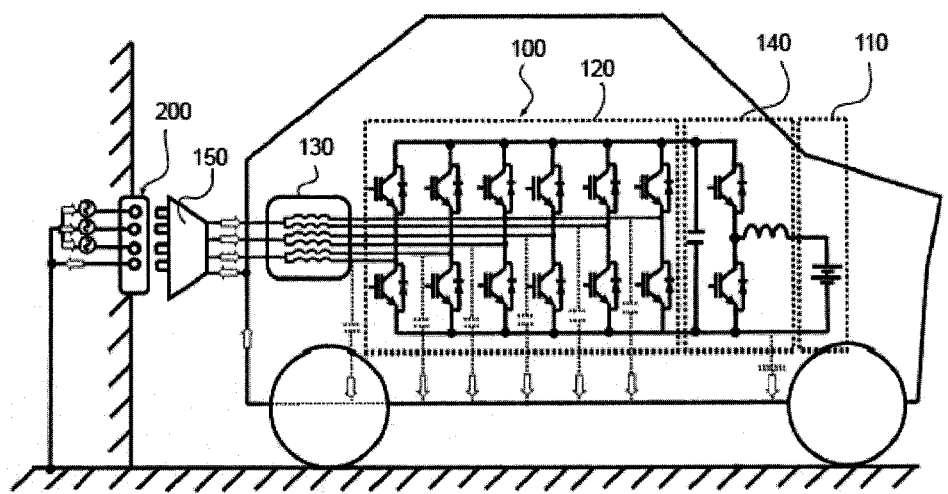
FIG. 1 represents schematically a combined electric device for charging and powering comprising an electric motor according to the invention installed in a motor vehicle.

FIG. 1 illustrates in a general manner a combined electric device 100 for charging and powering formed by rechargeable batteries 110, an inverter 120 and an electric motor 130 according to the invention making it possible both to recharge the rechargeable batteries 110 from a three-phase electricity network 200 in charging mode and to power the three-phase electric motor in order to set it in rotation in powering mode.

Advantageously, the inverter has an H bridge structure for each phase of the motor thus making it possible to conserve the neutral connection of each phase of the motor when the batteries are charged; however, the inverter may, in a more conventional manner, be an inverter made with three-phase bridges and switching means of the power contactor type in order to switch from the mode of charging the batteries 110 to the mode for powering the motor 130.

The device 100 may also comprise a DC/DC (direct current-direct current) converter 140 between the inverter 120 and the batteries 110 making it possible to adapt the voltage of the powering electricity network 200 to the characteristics of the batteries 110 and to optimize the size of the inverter 120 without degrading the performance of the device 100.

Finally, the device 100 also comprises connection means 150 for connecting the device 100 to the electricity network 200 when the batteries need charging.

In the rest of the application, emphasis will more particularly be placed on the electric motor 130, of the alternating-current type, formed by a rotor and a stator and on the method of winding the stator of the alternating-current motor 130. The rotor of the motor may be without distinction a permanent-magnet rotor, a field-coil rotor or else a squirrel cage.

In general, the stator of an alternating-current electric motor 130 of a combined device 100 for charging and powering comprises at least two windings that are connected to the phases of the electricity network when the device 100 is in charging mode.

In the case of a single-phase charging network, the stator comprises two phase windings and in the case of a three-phase charging network, the stator comprises at least three phase windings.

Since three-phase motors are the most widely used motors in the industry and in the motor-vehicle traction systems as illustrated in FIG. 1, various winding modes of a three-phase motor will be mainly described. However, the invention is not limited to a three-phase motor and it can be applied by analogy to a polyphase motor or a single-phase motor.

Figure 2:
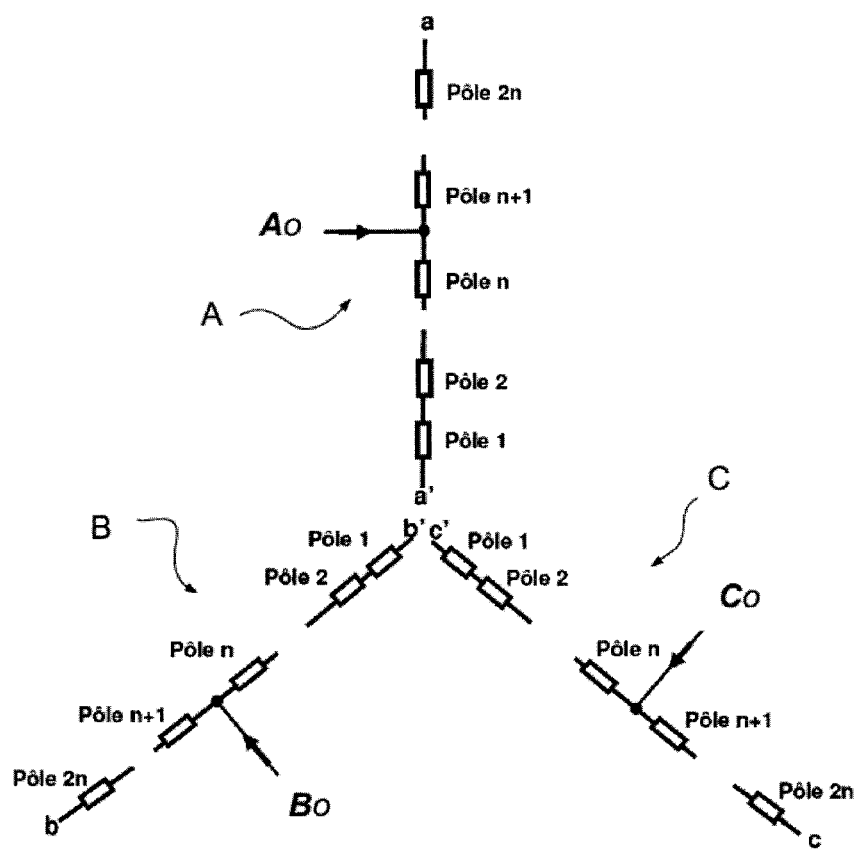
FIG. 2 represents schematically a first mode of winding a three-phase motor stator of an electric motor according to the invention.

FIG. 2 is a diagram representing a first winding principle of a three-phase motor stator, the three phases of which are marked A, B and C, incorporating connection points A0, B0, C0 for the injection of the charging current and making it possible to dispense with movements of the rotor in charging mode.

In this first embodiment, the stator is wound so that each phase of the stator connected to a phase of the network is formed by a plurality 2n of coils wired in series. Each of the coils of each phase participating in the formation of the various poles of the stator.

The connection points A0, B0, C0 are positioned so that they separate each phase winding A, B, C into two half-windings or two half-coils comprising respectively two connection points a-a', b-b', c-c' advantageously connected to the branches of the inverter 120 as illustrated in FIG. 1.

Advantageously, the connection points A0, B0, C0 are the mid-points of each phase winding and are positioned so that each of the two groups of coils comprises n coils in series and the same number of turns.

With this first winding mode, the charging current injected at the mid-points A0, B0, C0 locally creates magnetomotive forces in the winding which oppose one another.

Moreover, each half-winding of a phase A, B, C comprises a plurality of coils wired together so as to reduce the magnetic linkage of each half-winding at the connection point A0, B0, C0 so that a non-zero apparent inductance exists at the mid-point in charging mode. In particular, the apparent inductance is greater than the leakage inductance of the coils. For example, the coils are wired as illustrated in FIG. 3.

The specific inductances of each half-winding do not cancel one another out which makes it possible to benefit at the mid-points A0, B0, C0 from an apparent inductance that is not zero in charging mode and that is therefore much greater than the leakage inductance associated with the imperfections of the coils.

FIG. 3 illustrates the winding mode described above in FIG. 2 on a three-phase stator with two pairs of poles with winding distributed over two slots. In this example, each pole is formed by the association of a coil of each phase comprising two turns. FIG. 3 also illustrates how to connect the mid-points A0, B0, C0 on each phase A, B, C according to the winding mode described in FIG. 2. Thus, in charging mode, the three-phase charging current of component $2i_A$, $2i_B$, $2i_C$ is injected on each phase of the stator connected to the three-phase network via the mid-points A0, B0, C0 and is distributed in the direction of the arrows illustrated in FIG. 3.

Figure 11:
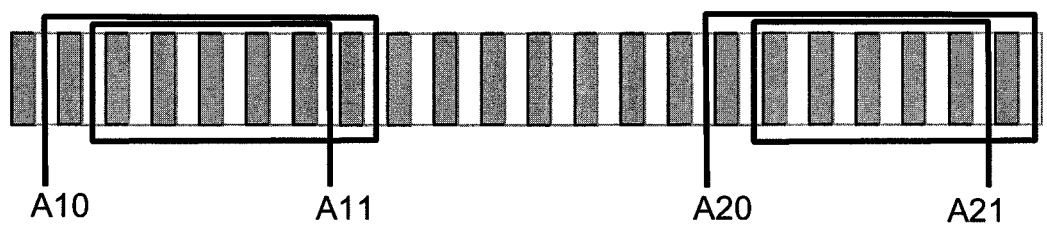
FIG. 11 represents schematically an exemplary distributed winding without a connexion point.
Figure 12:
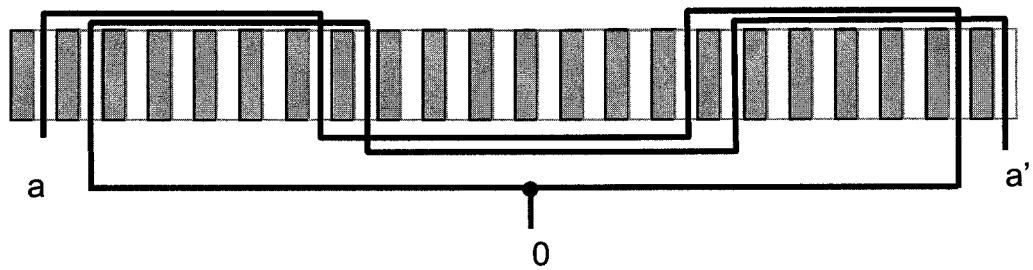
FIG. 12 represents schematically an exemplary distributed winding with a connexion point according to the prior art.

The example in FIG. 3 according to the invention will be better understood by referencing to FIGS. 11 and 12.

FIG. 11 shows an example of a distributed winding. A first winding is powered through its terminals A10, A11. A second winding is powered through its terminals A20, A21. The two windings have no connexion point in common.

FIG. 12 shows an example of a distributed winding with a connexion point O according to the prior art. An input current in connexion point O is divided in a first current flowing through a first half-winding to a terminal a, and a second current flowing through a second half-winding to a terminal a'. We notice that coils pertaining to different half-windings are positioned on same side relative to the connexion point O. These coils are strongly linked but pertain to different half-windings. Thus, the exemplary winding on FIG. 12 does not allow obtaining an apparent inductance greater than a leakage inductance of the coils.

FIG. 4 is a diagram representing a second winding principle of a stator of a three-phase motor, in which the three phases are marked A', B' and C', incorporating mid-points A0', B0', C0' for the injection of the charging current and making it possible to prevent movements of the rotor in charging mode.

In this second embodiment, the winding of the stator consists in connecting n' groups of coils in series, each of the n' groups of coils being formed by a plurality n of coils wired in parallel.

The advantage of such a winding, called serial-parallel winding, as illustrated, makes it possible initially to produce a winding with conductors of small cross section because the charging current is distributed in a balanced manner in the various branches in parallel of the winding, which makes the winding operations easier.

The connection points A0', B0', C0' are positioned so that they separate the winding into two half-windings comprising several groups of n coils in parallel. According to one advantageous embodiment, the connection points A0', B0', C0' are the mid-points of the phase windings of the stator. In this case, the connection points A0', B0', C0' are positioned so that the phase windings are partitioned into two symmetrical half-windings having the same number of coils on either side and forming the same number of pairs of poles on either side, that is to say (n'·n)/2 poles. In a manner similar to the previous winding mode, the connection points of the ends of the phase windings a-a', b-b', c-c' are advantageously connected to the branches of the inverter 120, as illustrated in FIG. 1.

Moreover, each half-winding of a phase A, B, C comprises a plurality of coils wired together so as to reduce the magnetic linkage of each half-winding at the connection point A0, B0, C0 so that a non-zero apparent inductance exists at the mid-point in charging mode. In particular, the apparent inductance is greater than the leakage inductance of the coils. For example, the coils are wired as illustrated in FIG. 5, 6, 7, 8 or 9.

The serial-parallel winding as illustrated thus makes it possible to magnetically decouple the two half-windings on either side of the mid-point. Thus, the mutual inductance of the two half-windings is weak which makes it possible to obtain a high apparent inductance that is needed at the mid-point for charging mode.

The decoupling of the half-windings may also be increased or reduced by physically moving the two half-windings further away or closer on the stator so that the reluctance of the iron of the stator is involved in the decoupling of the two half-windings.

Figure 5:
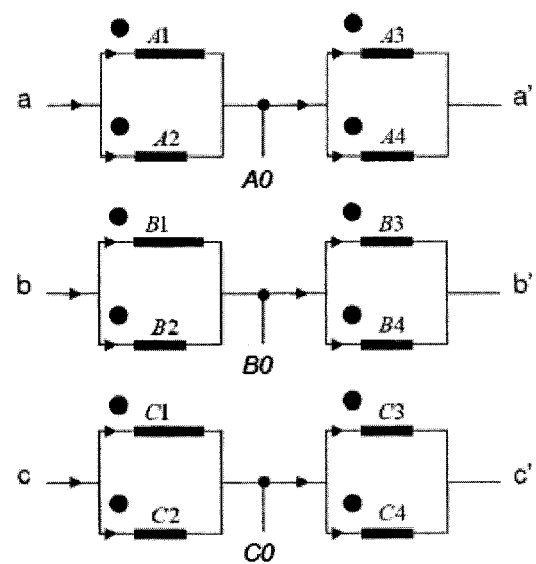
FIG. 5 represents schematically an example of wiring of a stator with serial-parallel winding with four poles according to the second mode of winding illustrated in FIG. 4.

For this purpose, FIG. 5 illustrates an example of wiring of a stator with serial-parallel winding with eight poles (i.e. four pairs of poles) in which each half-winding of a phase winding is diametrically separated.

In FIG. 5, the dots that can be seen close to the coils define the direction of winding of the winding in the slots provided for this purpose on the stator.

Figure 6:
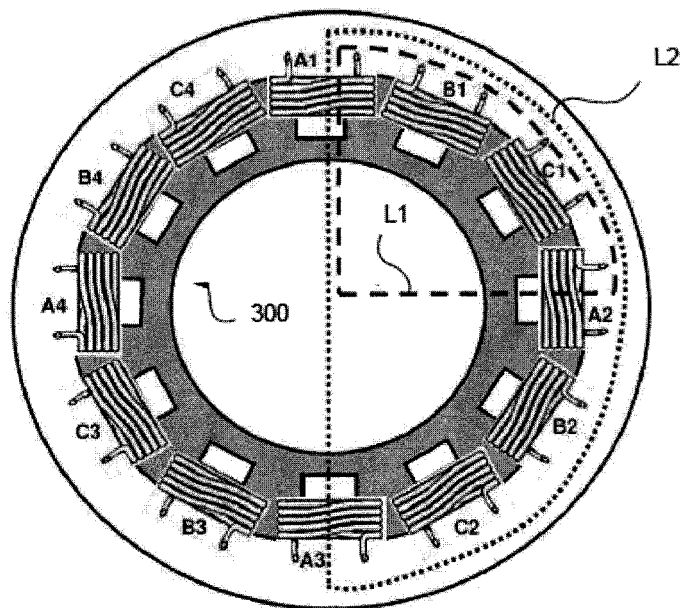
FIG. 6 represents schematically a stator wired according to the wiring example illustrated in FIG. 5.

FIG. 6 represents schematically a stator 300 wired according to the example of FIG. 5 in which the coils of the first half-winding are diametrically separated from the coils of the second half-winding.

Reference L1 represents the mutual flux between two coils A1, A2 separated by a quarter turn in the clockwise direction and the reference L2 represents the mutual flux between two diametrically opposed coils A1, A3.

The reluctance between the two diametrically opposed coils A1, A3 is greater than that between the two coils A1, A2 separated by a quarter turn in the clockwise direction. The mutual flux L1 is therefore greater than the mutual flux L2. Thus, the two coils A1, A2 separated by a quarter turn in the clockwise direction are strongly linked, whereas the two diametrically opposed coils A1, A3 are weakly linked.

Thus, in the phase A, the coils A1, A2 belong to the same half-winding, while the diametrically opposed coils A1, A3 belong to different half-windings.

A similar distribution of the coils is applied to the other phases B, C.

Figure 7:
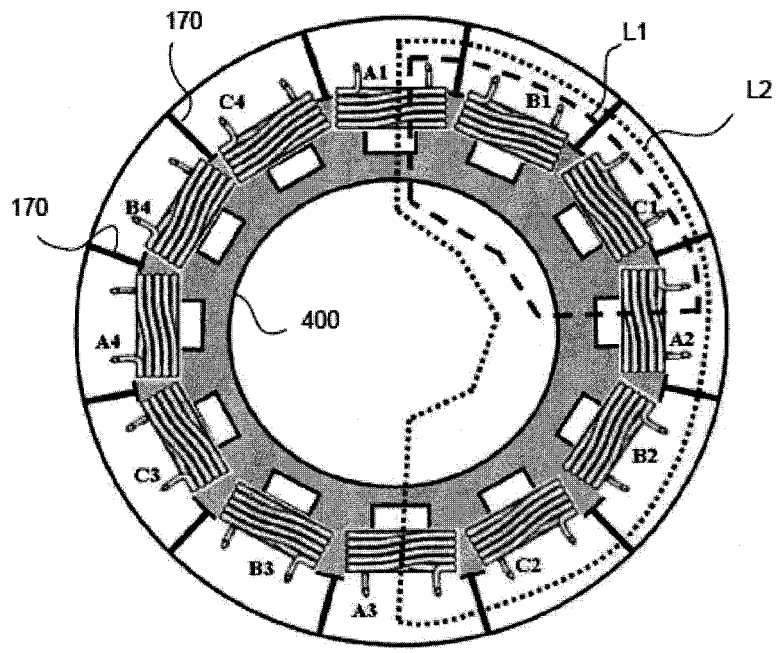
FIG. 7 represents schematically a second embodiment of a stator wired according to the wiring example illustrated in FIG. 5.

According to another embodiment, the decoupling of the two half-windings can be increased by the addition of air gaps on the stator 400, as illustrated in FIG. 7.

FIG. 7 shows an example of an electric motor according to the invention comprising a stator wired according to the wiring example illustrated in FIG. 5. The air gaps are defined by spacers 170, preferably in a non magnetic or non metallic material. The length of the spacers 170 determines the width of the air gaps.

Considering the phase A, the air gaps increase the reluctance between the coils A1 and A3 relative to the example in FIG. 6. Thus, the coils A1 and A3 are again more weakly coupled than in the example of FIG. 6. The magnetic linkage of each half-winding at the connection point is therefore reduced relative to the example in FIG. 6.

Finally, the design of the rotor may also additionally participate in the decoupling of the two half-windings, notably through the openings necessary to the placement of the magnets, through the presence of an air gap or else through openings intentionally added in the rotor in order to increase the reluctance between the two half-windings of the stator.

Figure 10:
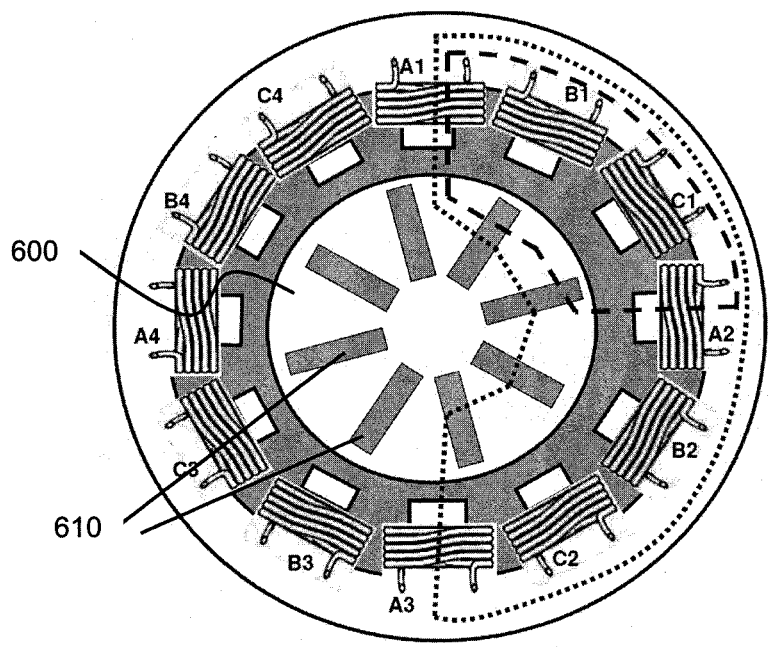
FIG. 10 represents schematically an electric motor according to the invention comprising a rotor having openings and a stator wired according to the wiring example illustrated in FIG. 5

FIG. 10 shows an example of an electric motor according to the invention in which the design of the rotor 600 participates in the decoupling of the two half-windings of a phase. The rotor 600 comprises openings 610 placed in a radial direction. In a particular example, the openings 610 contain magnets.

In the example of FIG. 10, the coils are wired as in FIG. 5. Considering the phase A, the openings 610 increase the reluctance between the coils A1 and A3 relative to the example in FIG. 6. Thus, the coils A1 and A3 are yet more weakly coupled than in the example of FIG. 6. The magnetic linkage of each half-winding at the connection point is therefore reduced relative to the example in FIG. 6.

Figure 8:
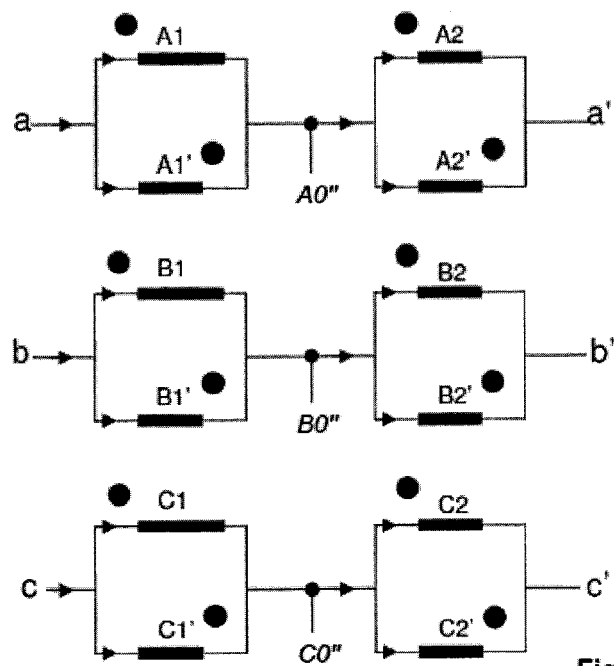
FIG. 8 represents schematically a third mode of winding a three-phase motor stator of an electric motor according to the invention.

FIG. 8 is a diagram showing a third principle of winding a stator of a three-phase motor, in which the three phases are marked A", B" and C", incorporating mid-points A0", B0", C0" for the injection of the charging current and making it possible to dispense with movements of the rotor in charging mode.

In each half-winding, the coils have fluxes that compensate for each other by virtue of the reverse-direction winding of the coils within the half-winding. Thus, the coupling of each half-winding at the connection point of the phase is reduced, or even zero.

Considering the phase A, in a half-winding, the coils are wound in reverse direction. The coils of a half-winding are travelled through by one and the same current. Thus, the flux of the coil A1 compensates for that of the coil A1', and the flux of the coil A2 compensates for that of the coil A2'. The magnetic linkage of each half-winding at the connection point A0 is therefore reduced, or even zero.

The illustrated winding makes it possible to obtain a stator in which the phases are magnetically independent, which makes it possible to obtain a zero mutual inductance between the phases.

This winding requires a stator comprising twice as many teeth as a stator with a conventional winding but the diameter of the stator is maintained because each tooth comprises half as many turns as a conventional winding.

Figure 9:
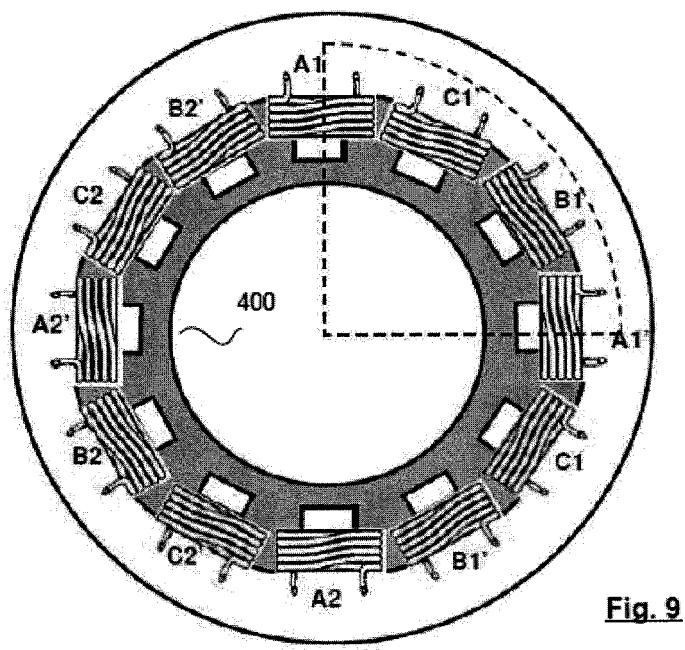
FIG. 9 represents schematically a stator with two pairs of poles wired according to the third wiring mode illustrated in FIG. 8 each half-winding of which is magnetically independent of the second.

Such a winding is shown on a stator 500 with two pairs of poles in which each half-winding is magnetically independent of the second, with reference to FIG. 9.

The invention has been mainly described for a three-phase motor; however, the invention can also be applied by transposition to a polyphase electric machine.

The invention has been mainly described with a domestic electricity network of the three-phase type; however, the invention can also be applied by transposition to a single-phase electricity network.

The invention has been mainly described for an application in an electric motor vehicle; however, the invention may be used in other fields and notably in energy generating devices of the wind or hydraulic type.

The other advantages of the invention are notably as follows:
  improved filtering of the currents in charging mode;
  improved control of the homopolar components in powering mode;
  improved tolerances of the motor in the event of a failure of a phase of the motor.

The invention claimed is:

1. An alternating-current electric motor of a combined electric device for powering and charging, the electric motor comprising:
  a stator configured to be connected to an electricity network, such that a charging current of the electricity network is injected via a connection point dividing each phase of the stator connected to a phase of the electricity network into two half-windings,
  wherein each half-winding of a phase comprises a plurality of coils wired together so as to reduce a magnetic linkage of each half-winding at the connection point so that there exists an apparent non-zero inductance at the connection point in charging mode of the electric device.

2. The alternating-current electric motor according to claim 1, wherein each half-winding is formed by a plurality of n coils wired in series.

3. The alternating-current electric motor according to claim 1, wherein each half-winding is formed by a plurality of groups of n'/2 coils wired in series, each of the plurality of groups comprising a plurality of n coils wired in parallel.

4. The alternating-current electric motor according to claim 1, wherein each half-winding comprises the same number of turns.

5. The alternating-current electric motor according to claim 1, wherein each of the half-windings of a phase is diametrically opposed on the stator to reduce the magnetic linkage between two half-windings of the phase.

6. The alternating-current electric motor according to claim 1, wherein the stator comprises air gaps at its periphery to reduce the magnetic linkage between the two half-windings of a phase.

7. The alternating-current electric motor according to claim 1, further comprising: a rotor comprising openings and/or air gaps for increasing a reluctance between the two half-windings of each phase of the stator.

8. The alternating-current electric motor according to claim 1, wherein the plurality of coils of a phase are distributed on either side of the connection point of the phase so as to reduce the magnetic linkage of the half-windings at the connection point.

9. The alternating-current electric motor according to claim 1, wherein each of the plurality of coils is distributed over several slots, and wherein two coils of a phase belonging to different half-windings are distributed over slots that are respectively positioned on either side of the connection point.

10. The alternating-current electric motor according to claim 1, wherein each half-winding comprises at least two coils wound in reverse direction one relative to the other so as to reduce the magnetic linkage between the two half-windings of a phase.

11. The alternating-current electric motor according to claim 10, wherein each half-winding comprises an even number of coils, each coil having a corresponding coil wound in reverse direction.

12. A combined electric device for powering and charging comprising:
   an alternating-current electric motor according to claim 1 connected to an electricity network;
   an inverter; and
   means for accumulating electric energy.

13. The combined electric device for powering and charging according to claim 12, further comprising a direct current-direct current converter.

* * * * *